V. R. ROBERTS.
FISHING REEL.
APPLICATION FILED MAY 21, 1908.
904,016.
Patented Nov. 17, 1908.
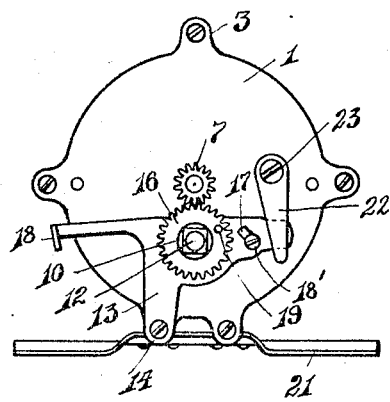
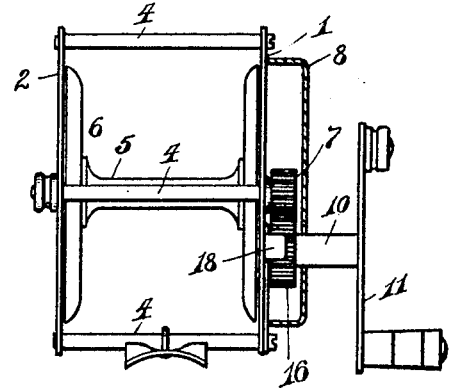
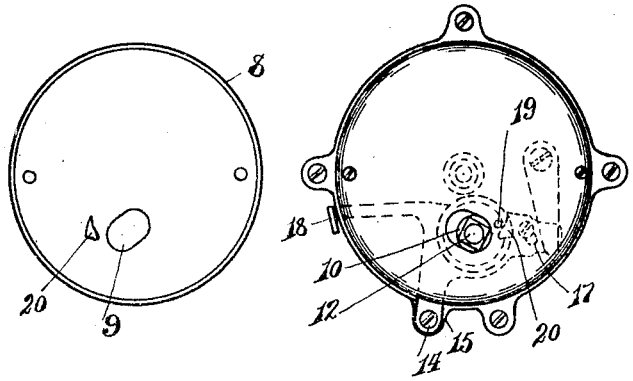
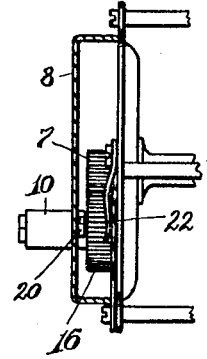
Witnesses:
George Oltsch
G. M. Cole.
Vano R. Roberts
Inventor.
By
Attn'y.

UNITED STATES PATENT OFFICE.

VANO R. ROBERTS, OF SOUTH BEND, INDIANA.

FISHING-REEL.

No. 904,016.  Specification of Letters Patent.  Patented Nov. 17, 1908.

Application filed May 21, 1908. Serial No. 434,167.

*To all whom it may concern:*

Be it known that I, VANO R. ROBERTS, a citizen of the United States, residing at South Bend, in the county of St. Joseph and State of Indiana, have invented certain new and useful Improvements in Fishing-Reels, of which the following is a specification.

This invention relates to fishing reels.
One object of the invention is to simplify and improve the type of fishing reels known as "casting reels" or "free-running" reels, the devices of this character being generally constructed whereby their gear mechanism may be thrown out of operation when casting and automatically restored to operative condition when it is desired to wind the reel for the purpose of reeling in the line.

In casting a bait it frequently becomes necessary to reel in the line rapidly as soon as the bait strikes the water so as to prevent the bait from sinking to the bottom of the stream and becoming entangled in weeds or other obstruction and as the interval of time between the striking of the water and the necessity of reeling in the line is of such short duration, it is expedient that devices of this character be provided with means whereby the reeling in of the line may be accomplished automatically.

It is therefore another object of my invention to expedite the drawing in of the line by providing a simple, inexpensive, durable and efficient means whereby the gear mechanism may be positively thrown either manually or automatically into operative condition and thereby greatly enhance the value or devices of the present character.

With the above and other objects in view the present invention consists in the combination and arrangement of parts hereinafter more particularly referred to, illustrated in the accompanying drawings and particularly pointed out in the appended claims, it being understood that changs may be made in the proportion, size and minor details without departing from the spirit or sacrificing any of the advantages of the invention.

In the drawings:—Figure 1 is an elevation of a fishing reel illustrating my invention applied thereto and shown partly in section and partly in elevation. Fig. 2 is a side view of a fishing reel, illustrating my invention, the casing thereof being removed to disclose the gear mechanism in operative condition for reeling in the line. Fig. 3 is a view similar to Fig. 2 illustrating my invention in dotted lines and showing the parts thereof in the position they occupy when the gear mechanism is in inoperative condition to permit of casting the line. Fig. 4 is a sectional view of my invention illustrating that part of the invention not seen in Fig. 1. Fig. 5 is an interior view of the casing illustrating the cam lug and the elongated opening in which works the stub shaft which drives the gear mechanism.

Referring now more particularly to the accompanying drawings, the reference characters 1 and 2 indicate the caps of the reel which are provided with the lugs 3 to which latter are connected the spacing rods 4, there being the usual shaft 5 for the spool 6 and on one end of which is mounted the pinion 7.

The character 8 indicates a casing adapted to inclose the operating parts of the invention and which may be secured to the cap 1 of the reel in any suitable manner and which is provided with slot 9 in which latter is mounted for rotatable and sliding movement the shank 10 of the crank handle 11, the free end of the shank 10 being mounted in a bearing 12 of a plate 13, pivoted at 14 to the lug 15 of the cap 1. On this shank 10 there is mounted a drive gear 16 adapted to be thrown into and out of mesh with the pinion 7 according to the disposition of the plate 13, the latter, as stated, being pivotally mounted. The pivotal movement of the plate 13 is limited by virtue of a slot 17 in which works a pin 18' carried by the cap 1, there being a finger grasping piece or handle part 18' at one end of the plate 13 whereby the latter may be moved pivotally upon its pivot 14 manually in either direction for the purpose of throwing the gears 7 and 16 into and out of mesh with each other.

The device as illustrated in Fig. 2 is in condition to reel in the line, and if it be desired to cast the line, the handle part 18 of the shiftable plate 13 is pressed upon or otherwise manipulated to shift the plate upon its pivot 14 into the dotted line position shown in Fig. 3. The line is then cast and before the bait reaches the bottom of the stream the handle part 18 of the plate 13 may be engaged to shift the plate 13 back to the position shown in Fig. 2 and thereby throw the pinion 7 and the gear 16 manually into operative relation. However, owing to the short period of time allowed the operator for reeling in the line to prevent the bait from reaching the bottom of the stream, it is preferred that the pinion and gear be thrown into mesh automatically, and in the present invention this may be accomplished quickly and positively with a minimum of friction by providing the driving gear 16 with a lateral projection 19 adapted to engage the cam lug 20 fixed upon the inner face of the casing 8 when the crank 11 is operated to reel in the line, the cam 20 being immediately in front of the projection 19 when the pinion 7 and the gear 16 are separated for casting purposes, so that immediately upon operation of the crank 11 the gears are automatically thrown promptly into mesh with a consequent shifting of the shiftable plate 13, the shank 10 being allowed sufficient play in the slot 9 of the casing 8 to permit bodily movement therefor and the consequent meshing and separating of the pinion and gear.

The reel may be readily attached to the fishing rod (not shown) in any suitable manner, such as by a securing plate 21, and in order to hold the shiftable plate 13 under tension in either or any of its positions there is provided a spring member 22 which is fixed at one end as at 23 and whose opposite end is adapted to yieldably engage the rear end of the shiftable plate in overlapping relation, as is clearly illustrated in the drawings, and which positively insures the holding of the shiftable plate in any of its positions.

What is claimed is:—

1. In a fishing reel, a driven shaft, a pinion on the shaft, a plate pivotally carried by the reel, a casing having a slot and a cam lug upon its interior adjacent the slot, a crank including a shaft working at one end in said plate, a gear upon the shank for mesh with said pinion, said pinion and gear being thrown out of mesh by manual movement of said plate in one direction and movable into mesh by manual movement of said plate in the opposite direction, the plate having a slot, an element projecting from the casing and extending into the slot of the plate to limit the movement of the latter in either direction of its movement, an element carried by the gear for contact with said cam lug when the gear is out of mesh with the pinion and is rotated by said crank handle to effect a shifting of said plate and said gear to automatically bring the gear and pinion into mesh to reel in the line by the continued operation of the crank handle, and a flat spring secured at one end to the reel and having its opposite end overlapping one end of said plate for placing the latter under tension.

2. In a fishing reel, a driven shaft, a pinion on the shaft, a plate pivotally carried by the reel, a casing having a slot and a cam lug upon its interior adjacent the slot, a crank including a shaft working at one end in said plate, a gear upon the shaft for mesh with said pinion, said pinion and gear being thrown out of mesh by manual movement of said plate in one direction and movable into mesh by manual movement of said plate in the opposite direction, the plate having a slot, an element projecting from the reel and extending into the slot of the plate to limit the movement of the latter in either direction of its movement, and an element carried by the gear for contact with said cam lug when the gear is out of mesh with the pinion to effect a shifting of said plate and said gear to automatically bring the gear and pinion into mesh to reel in the line by continued operation of the crank handle.

3. In a fishing reel, a driven shaft, a pinion upon the shaft, a shiftable plate, a crank handle including a shank portion mounted at one end in said plate, a gear mounted upon said shank and adapted to be thrown into and out of mesh with said pinion according to the positioning of said plate, a flat spring secured at one end to the reel and having its inner flat surface bearing on one end of said shiftable plate to place the latter under tension, and a casing inclosing the body of said plate, the pinion and the gear.

In testimony whereof I affix my signature, in presence of two witnesses.

VANO R. ROBERTS.

Witnesses:
GEORGE OLTSCH,
G. M. COLE.